United States Patent [19]

Rodriguez

[11] 4,303,721
[45] Dec. 1, 1981

[54] CLOSED CELL FOAM PRINTING BLANKET

[75] Inventor: Jorge M. Rodriguez, Miami, Fla.

[73] Assignee: W. R. Grace & Co., Cambridge, Mass.

[21] Appl. No.: 59,343

[22] Filed: Jul. 20, 1979

[51] Int. Cl.³ .................... B32B 7/02; B32B 5/18
[52] U.S. Cl. ...................... 428/213; 428/215; 428/315; 428/320; 428/908; 428/909
[58] Field of Search ............ 428/908, 909, 315, 320, 428/213, 215

[56] References Cited

U.S. PATENT DOCUMENTS

| | | | |
|---|---|---|---|
| 2,792,322 | 5/1957 | Fredericks | 428/909 |
| 3,033,709 | 5/1962 | Brown | 428/909 |
| 3,054,146 | 9/1962 | Griffin | 264/50 |
| 3,118,783 | 1/1964 | Nagle et al. | 427/238 |
| 3,505,249 | 4/1970 | Skochdopole et al. | 521/58 |
| 3,585,158 | 6/1971 | Luijk et al. | 521/79 |
| 3,637,458 | 1/1972 | Parrish | 428/315 |
| 3,676,282 | 7/1972 | Volmer | 428/909 |
| 3,700,541 | 10/1972 | Shrimpton et al. | 428/908 |
| 3,773,551 | 11/1973 | Kiener et al. | 428/216 |
| 3,795,568 | 3/1974 | Rhodarmer et al. | 428/909 |
| 3,819,471 | 6/1974 | Sohnemann | 428/909 |
| 3,855,378 | 12/1974 | Topcik | 264/54 |
| 3,880,705 | 4/1975 | Tilburg | 162/101 |
| 3,880,970 | 4/1975 | Nisonovich et al. | 264/54 |
| 3,881,045 | 4/1975 | Strunk | 428/909 |
| 3,887,750 | 6/1976 | Duckett et al. | 428/909 |
| 3,903,794 | 9/1975 | Grupe et al. | 428/908 |
| 3,911,190 | 10/1975 | Myers et al. | 428/315 |
| 3,959,197 | 5/1976 | Salyer et al. | 521/54 |
| 3,959,545 | 5/1976 | Siedenstrang | 428/310 |
| 3,983,287 | 9/1976 | Goossen et al. | 428/909 |
| 4,015,046 | 3/1977 | Pinkston | 428/909 |
| 4,025,685 | 5/1977 | Haren et al. | 428/909 |
| 4,032,606 | 6/1977 | Vasilievich et al. | 428/315 |
| 4,042,743 | 8/1977 | Larson | 428/909 |
| 4,086,386 | 4/1978 | Gaworowski et al. | 428/909 |
| 4,093,764 | 6/1978 | Duckett et al. | 428/909 |
| 4,095,008 | 6/1978 | Sundstrom et al. | 428/310 |
| 4,096,219 | 6/1978 | Mollenbruck et al. | 264/54 |
| 4,105,722 | 8/1978 | Sorenson | 264/54 |
| 4,133,931 | 1/1979 | Beale et al. | 428/315 |
| 4,159,294 | 6/1979 | Oishi et al. | 264/54 |
| 4,174,244 | 11/1979 | Thomas et al. | 428/909 |

FOREIGN PATENT DOCUMENTS

| | | |
|---|---|---|
| 1062670 | 3/1967 | United Kingdom . |
| 1196090 | 6/1970 | United Kingdom . |
| 1204332 | 9/1970 | United Kingdom . |
| 1205043 | 9/1970 | United Kingdom . |
| 1240733 | 7/1971 | United Kingdom . |
| 1245831 | 9/1971 | United Kingdom . |
| 1294606 | 11/1972 | United Kingdom . |
| 1444710 | 8/1976 | United Kingdom . |

OTHER PUBLICATIONS

Professional Printer, vol. 22, No. 6, pp. 2–7.

*Primary Examiner*—William J. Van Balen
*Attorney, Agent, or Firm*—Edward J. Hanson, Jr.; C. E. Parker

[57] ABSTRACT

A new resilient compressible printing element having a rubber layer with foamed closed cells therein. The closed cells are formed by the use of blowing agents which are activated and foam the material while an external pressure is applied to the material to restrict expansion.

6 Claims, 2 Drawing Figures

CLOSED CELL FOAM PRINTING BLANKET

BACKGROUND OF THE INVENTION

This invention relates to resilient compressible printing elements and in particular to those having an intermediate layer of foamed rubber.

It is known in producing resilient compressible printing elements to have a cellular intermediate layer as described in the article "New Developments in Off-Set Blankets" pages 2–7, *Professional Printer*, Volume 22, Number 6. However, the only closed cell materials revealed in the article were those made using microsheres which were crushed. When blowing agents were used an open cell structure was produced in which the cell walls ruptured causing the cells to be interconnected. In the article "New Development in Off-Set Blankets" at page 3 it is pointed out that open celled foams are not satisfactory while the closed cells produced by the breaking of microspheres yielded good results because the closed structure recovered more quickly than the open structure because the gas contained in the voids was compressed and only had to expand after compression. Among other deficiencies, the use of microspheres is an expensive manufacturing procedure and results in the retention of a substantial amount of residue within the void from the microsphere body. U.S. Pat. No. 3,887,750 shows the use of discrete hollow fibers to obtain a closed cell and U.S. Pat. No. 3,795,568 shows the use of particles of compressible latex foam rubber to obtain the closed cells. Both of these approaches have the disadvantage of having substantial internal structure within the closed cell of the matrix forming the compressible layer. They also require the premanufacture of the structures to be incorporated in the rubber matrix.

Closed cell systems enable the provision of sufficient unfoamed rubber surrounding the cells to provide a large enough tensile force to prevent delamination or internal splitting of the compressible foam layer. This property also permits the use of thicker compressible layers to provide adequate void volume to absorb minor smashes preventing damage to the printing blanket.

A closed celled system also prevents capillary absorption of solvent through the edges of a printing element. Open celled foam and non-woven compressible layers are subject to capillary absorption with resulting weakening of the compressible layer.

It is a primary object of the present invention to provide a better printing blanket, particularly for uses such as lithographic printing.

Another object of the present invention is to provide a printing blanket that does not require a fabric reinforcing between the compressible layer and the printing face.

SUMMARY OF THE INVENTION

By an aspect of the invention, a resilient compressible printing element is provided having base layer chosen from the group consisting of a machine direction, elongation stabilizing material and an adhesive material and a compressible layer, with the compressible layer being a layer of foamed rubber having a substantially closed celled structure. Preferably at least about 50% of the foamed cells are closed and have average cell diameters of between ½ and 10 mils and the compressible layer has a void volume of at least 20%, a thickness of not more than 30 mils and is not more than 20 mils from the face of the element. An important feature of the invention is being able to form a printing element that is free of any reinforcing fabric between the compressible layer and the face coating. An important aspect in making this possible is believed to be the provision of a hard rubber layer between the compressible layer and the face layer, preferably one having a durometer of 75.

DESCRIPTION OF THE PREFERRED EMBODIMENTS

Figure 1:
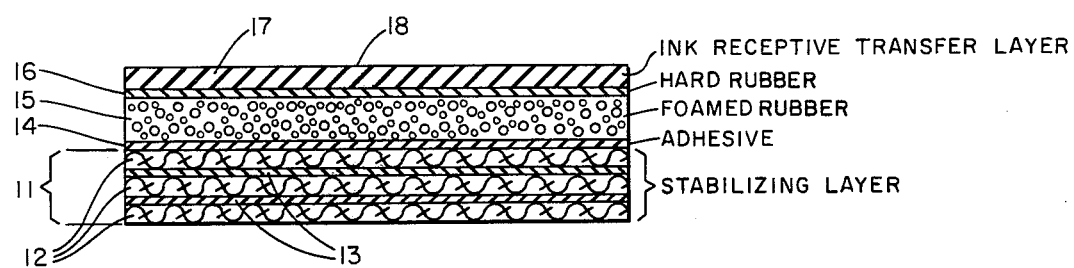
FIG. 1 is an enlarged sectional view of a lithographic printing blanket incorporating the present invention with the components labeled.

Referring to FIG. 1 the lithographic printing blanket may be seen to have a stabilizing layer 11 comprised of three woven textiles 12 laminated together with neoprene adhesive layers 13. Next a nitrile rubber adhesive layer 14 is provided and above this is the compressible layer 15. Above the compressible layer 15 is a hard rubber stabilizing layer 16. The stabilizing layer 16 is overlaid by a face layer 17 whose surface forms an inking face 18.

The features of the composite lithographic printing blanket that are considered to be features of the present invention are foamed layer 15 and the combination of the foamed layer 15 and the hard rubber stabilizing layer 16. The other features were known prior to the present invention and are not considered to be special features of the present invention. The composition of the hard stabilizing rubber layer 16 is not new to the present invention except in combination with the closed celled compression layer 15. The stabilizing layer 11 and the face layer 17 may be of any construction and composition known to the art of printing blankets, varied to accomodate the specific intended end use. It is considered important to have, as a general proposition, the compressible foamed layer 15 as close to the outer face 18 of the composite resilient compressible printing element as possible.

It is also considered important to employ the hard rubber layer 16 because this is one of the features that helps to make possible the elmination of the necessity of adding a woven stabilizing layer between the compressible layer and the face layer 17. The use of a fabric between the compressible layer and the face layer was previously necessary to distribute the impact of impingement to prevent the compressible layer from flowing and distorting the print, particularly dots. The fabric also prevented the prior art foams from splitting and otherwise being damaged. The inherent strength of the closed celled foam layer itself is perhaps the more important key to being able to omit the fabric and indeed the hard, rubber layer 16 is not believed to be necessary in all printing blanket applications. While it is a feature of the invention to be able to leave out the fabric reinforcement, in its broader concept certainly the mere use of the fabric layer is not intended to avoid infringement.

The stabilizing layer 11 provides low elongation in the machine direction. The stabilizing layer may be omitted in proper circumstance and an adhesive (pressure sensitive) layer applied to adhere the printing blanket to the blanket cylinder. The blanket cylinder then serves as the stabilizer.

In its broadest application the invention may be considered simply the substitution of the foamed layer 15 for the compressible layer in any resilient compressible printing element. This compressible layer is a key element of the present invention and is a layer of foamed rubber having a substantially closed celled structure. The cells of the foamed compressible layer are preferably at least 50%, more preferably at least 80% closed celled with the cells preferably having an average diameter of between $\frac{1}{2}$ mil and 10 mils, more preferably of 2 to 7. The void volume of the compressible layer is preferably at least 20%, more preferably at least 30%, and the thickness is preferably not more than 30 mils, more preferably not more than 20 mils with the foamed compressible layer preferably being not more than 20 mils, more preferably 15 mils, from the face 18 of the element.

The foamed layer is formed as a virgin blown foam by gas expansion and is free of solid material internal of the closed cell walls of the rubber matrix of the compressible layer other than blowing agent residue. The cells do not contain any residue beyond chemical blowing agent residue. This means that no particulate material or structurally significant cell wall linings and the like are present which might interfer with or modify the compression characteristics of the matrix and the inherent properties of its virgin cell structure either initially or over a period of time. By virgin it is meant that the cellular structure was formed in the structure as it is to be used and not chopped up and bound together with a binder or the like.

Any rubber having good integrity can be compounded for use as the matrix of the compressible layer in the present invention. In addition to the preferred nitrile rubber, natural neoprene, butadiene-styrene, ethylene-propylene, polybutadiene, polyacrylic polyurethane, epichlorohydrin, chlorosulfonated polyethylene can be used to advantage. The rubber compositions can of course contain stabilizers, pigmenting agents, plasticizers and the like. In addition the composition will normally have been cross linked with peroxides or more often vulcanizing agents particularly sulfur. Of course, a blowing agent will have been employed to produce the foam cells. The preferred blowing agents are heat activated blowing agents such as those decomposing to produce nitrogen gas.

The percentage of the cells that are closed is determined by slicing through a section of the closed celled structure, then counting the cells that do not exhibit any opening into another cell or void then counting the open cells and then calculating the percent of the total that are closed. The cells are counted in any selected continuous area so long as the area includes at least 100 severed cells opened for inspection. To determine the cell diameter of the closed cells, the 20% of the closed cells having the largest openings are measured and the average of their diameters is taken.

The hard rubber layer between the compressible layer and the face layer preferably has a durometer of 75 which is a Shore A hardness. Its hardness is preferably between 75 and 95 durometers. Generally such rubbers will contain substantial amounts of inorganic fillers or carbon black and more rigid thermosetting polymers such as the phenolic resins in combination with rubbers such as those listed above for the compressible matrix rubber.

PROCESS

The process for foaming materials according to the present invention involves, incorporating a foaming agent in the material and foaming the material while subjecting the material to an external pressure and then heat. This is preferably done by applying super-atomspheric gas pressure to the outer surface of the material, activating the foaming agent via thermal energy while maintaining the super-atmospheric gas pressure on the outer surface of the material, and foaming the material through the means of the thermal decomposition of the foaming agent while maintaining the super-atmospheric pressure on the outer surface of the material. The material is preferably in a plastic rubber state when the foaming begins and is significantly set or, that is, vulcanized or cross-linked before the foaming is completed and the super-atmospheric pressure is maintained on the outer surface of the material until the foaming is at least substantially complete.

The external gas is preferably air and the pressure is preferably at least 10 psi gauging more preferably 50 psi and most preferably at least 100 psi. Preferably the external pressure is between 50 and 200 psi gauge. All psi's are gauge readings above atmospheric. In addition, external pressure may in some instances be applied by other means than gas, for example, by a tensioned belt.

The preferred materials to be foamed are those mentioned above for the composition of the foamed material. These, when properly compounded, yield set rubber matrices. Preferably the procedure for manufacturing the foamed structure provides for heating to both activate the foaming agent and stabilize the foam, in the case of rubber by vulcanization or cross-linking.

To prepare the printing blanket, the material incorporating the foaming agent is preferably applied to the stabilizing layer before the external pressure is applied and foaming is carried out. The face layer is preferably applied after the foaming procedure has been completed.

A hard stabilizing rubber layer having the characteristics previously described, is preferably applied to the foamed material before the face layer is applied and the face layer is applied over the hard rubber stabilizing layer.

It is generally a good idea to provide a good adhesive layer between the stabilizing substrate 11 and the foamed layer 15. The various layers may be conveniently applied by knife coating. Other method of application, such as extrusion or calendaring may also be used.

METHOD OF PRINTING

The method of printing according to the present invention involves the use of a closed celled foam disposed toward the printing indicia without any intervening fabric during printing. The closed celled foam is a virgin foam rubber free of any residue in the cells except from gas producing blowing agents. The closed celled foam is preferably part of the printing element described above and has the properties already described.

While the invention has been described with its main purpose in mind and in particular that of producing a superior lithographic printing blanket in a very economical manner, it is obvious that the method lends itself to use in other foaming arts such as, for example, foaming polystyrene or polyurethane to obtain foams of greater strength than usually found and having special properties.

Turning to clarifying meanings of several terms used earlier, "super-atmospheric gas pressure" simple means a pressure deliberately elevated above the atmospheric pressure at the elevation where the procedure is being carried out. "Plastic rubber" means a rubber that can flow. "Set" or vulcanized rubber is a rubber that upon stretching will recover to nearly its original shape in preference to flowing. "Foaming" means any method of forming bubbles or voids in a material by the expansion of gas or formation of gas within the material. "Compressible" means that the total volume of the material is reduced when the material is subjected to pressure.

The following example further illustrates the nature and advantages of the present invention.

EXAMPLE

A lithographic printing blanket was constructed in the following manner. The following ingredients were compounded in a Banbury mixer to form an expandable nitrile rubber compound.

| INGREDIENTS | AMOUNT (PARTS) |
|---|---|
| Nitrile Rubber (HYCAR 1051- B. F. Goodrich) | 100 |
| Sulphur (Crystex 90- Stafford Chemical) | 0.4 |
| Blowing agent heat activated, nitrogen releasing - p,p-oxybis - (benzene sulfonyl hydrazide)(Celogen OT- Uniroyal) | 10 |
| Dispersing Agent- aids in preventing cell collapse (VS-103 Airproducts & Chemical) | 4 |
| Dispersing Agent - stearic acid | 1.5 |
| Vulcanization activator - zinc oxide | 5 |
| Carbon Black N650 black | 50 |
| Anti-oxidant-symetrical di-beta-naphthyl-p-phenylenediamine (Agerite white- R. T. Vanderbuilt) | 1 |
| Plasticizer- di(butoxy-ethoxy-ethyl) formal (TP-90B- Thiokol Chemical) | 10 |
| Accelerator - tetramethylthiuramdisulphide | 3 |

All of the ingredients except the blowing agent, first listed dispersing agent and accelerator were initially mixed with a dump temperature of 275°–290° F. and then those items were added with a maximum dump temperature of 185° F., lifting ram if necessary.

The expandable nitrile rubber mixture compounded above was dissolved in propylene dichloride solvent to form a 33% solution of the rubber compound by mechanical agitation. The solution had the approximate viscosity of molasses. 120,000 cps as measured by Brookfield Viscometer.

A backing substrate was positioned for knife coating with the solution of expandable nitrile rubber compound. The backing was a laminate of three layers of cotton fabric laminated together with neoprene adhesive and coated with a nitrile adhesive to provide good adhesion with the expandable nitrile rubber compound. The expandable nitrile rubber compound solution was knife coated over the nitrile adhesive to a thickness of 20 mils. The solution was coated on in about ½ mil thicknesses and the solvent removal was accelerated by heating to about 150° F. for about 60 seconds per pass through the coater until the 20 mil thickness was attained. Then talc was dusted on the surface to prevent the surface from being sticky.

A 37 yard length of the thus formed composite was placed in an autoclave in festoon fashion. The pressure in the autoclave was brought to 145 psi gauge and the temperature was then raised to 285° F. over a period of about 4–5 minutes and then maintained for 8 minutes. The nitrile rubber compound was thereby foamed. After 8 minutes the pressure was released and the foamed composite structure was removed from the autoclave and cooled at ambient temperature. Then the face of the foamed nitrile rubber layer was ground with 240 grit abrasive paper to obtain an overall composite thickness of 59 mils, with the fabric substrate making up approximately 41 mils, the adhesive layer approximately 1 mil and the foamed nitrile rubber layer approximately 17 mils.

The ground foamed surface was then knife coated with a 5 mil layer of the following hard rubber compound. The following ingredients were compounded in a Banbury mixer.

| INGREDIENTS | AMOUNT (PARTS) |
|---|---|
| Nitrile Rubber (HYCAR 1051) | 100 |
| Thermosetting phenolic resin with 8% hexamethylenetetramine (Durez 12687 - Durez Plastic Division of Hooker Chemical Co.) | 55 |
| Carbon Black N550 | 20 |
| Precipitated hydrated silica HiSil 233 - PPG Industries | 20 |
| Di ethylene glycol | 15 |
| Zinc Oxide | 5 |
| Stearic Acid | 2 |
| Antioxidant-diphenlamine-acetone reaction product (Agerite-Superflex- R. T. Vanderbuilt) | 2 |
| Sulphur (Crystex 90) | 0.5 |
| n-(cyclohexyithio-phthalimide (Santogard PV1 - Monsanto) | 0.4 |

The thus formed compound was then dissolved in methyl ethyl ketone and toluene to form a 33% solution of the compound by mechanical agitation. A 10% solids solution in toluene of the following curing agents was prepared by mechanical agitation.

| | AMOUNT (PARTS) |
|---|---|
| (2-morpholinothio) benzothiazole (Santocure MOR Monsanto) | 1.23 |
| Tetramethylthiuramdisulfide (Thiruad Monsanto) | 0.8 |
| Sulphur (Crystex 90) | 0.6 |

The above two solutions were then combined and knife coated as already described. The hardness of the cured hard rubber was 85 durometer Shore A hardness.

A 5 mil thick layer of surface rubber was then knife coated over the hard rubber compound to provide an ink receptive transfer layer. The final thickness of the lithographic printing blanket is 67 mils.

The void volume of the foam rubber layer was 31%, this was determined by emersing a small segment of the foam (0.020×1×1 inch) in a solution of isopropanol and water of known density the solution's density was measured by a calibrated hydrometer. By observing whether the sample floated or sank in a solution of known density it was determined whether the samples density was less, if it floats, or greater, if it sinks. By adjusting the solutions density so that a floating sample just starts to sink the samples density was closely estimated. The density of the rubber before foaming was determined. Then using the density of the foamed and unfoamed rubber the void volume was calculated by the formula $$\% \text{ void volume} = \left[ \frac{\left( \frac{1}{\text{density of foam}} - \frac{1}{\text{density of rubber}} \right)}{\frac{1}{\text{density of foam}}} \right] 100$$

$$31\% \text{ void volume} = \left[ \frac{\left( \frac{1}{0.82} - \frac{1}{1.19} \right)}{\frac{1}{0.82}} \right] 100$$

The percent of the closed cells was found to be approximately 95%. The average cell diameter was determined to be 4 to 5 mils. Both of these last two parameters were established as described earlier in the application.

This lithographic printing blanket was then tested on a standard sheet feed lithographic press with good results.

Figure 2:
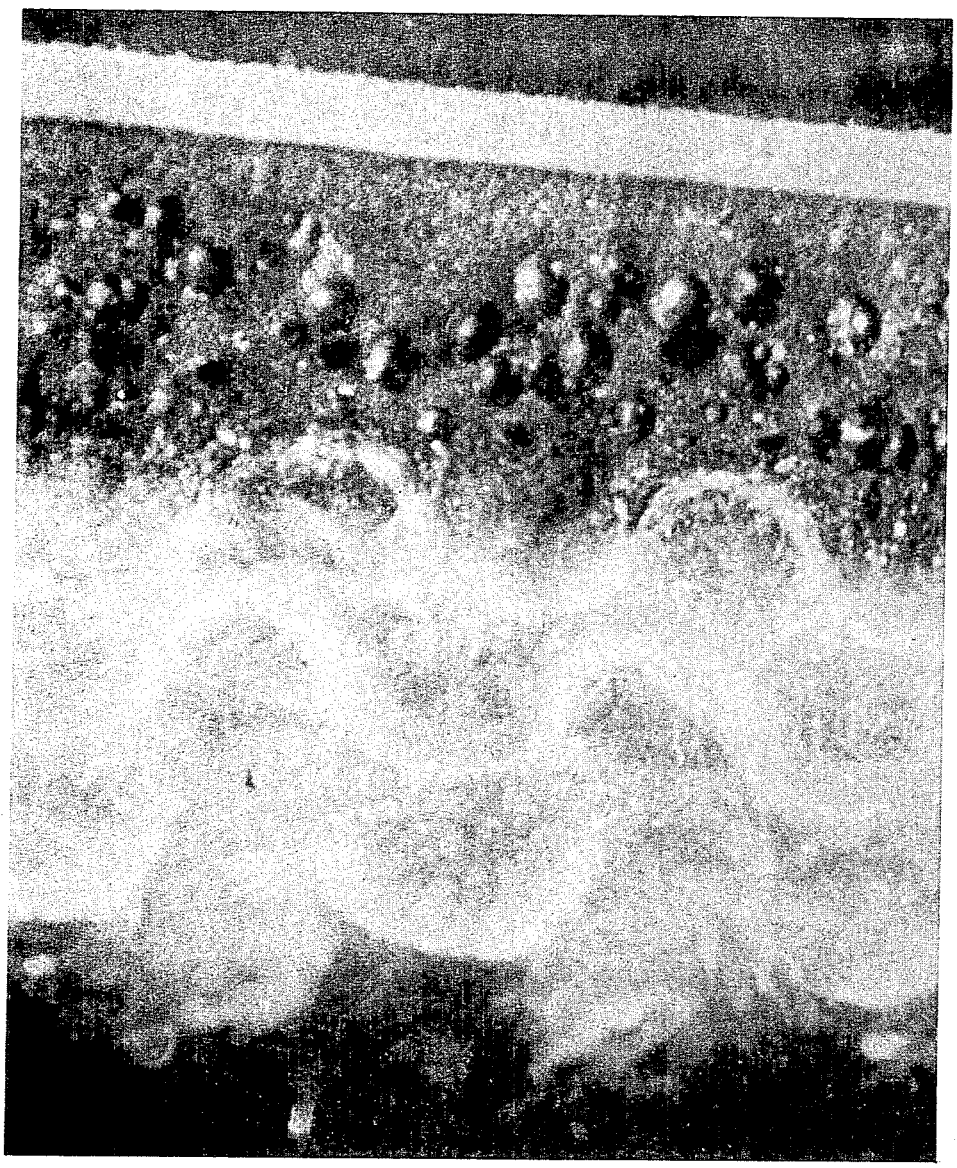
FIG. 2 is a photomicrograph in the same view as the illustrative drawing of FIG. 1.

FIG. 2 is a microphotograph of the lithographic printing blanket of Example 1.

The adhesive layer penetrated into the yarn and thus the demarkation is not sharp but the adjacent foam cells are generally aligned in their lower extent thus showing fairly clearly that the adhesive has tended to serve a leveling function. The top foam cells are reasonably aligned showing the general margin between the hard rubber layer and the foamed high modulus rubber layer. The ink receptive transfer layer is the light colored surface layer. The photomicrograph is on a scale of 1 inch=about 11 mils or a magnification of about 90.

It will be obvious to those skilled in the art that various changes and modifications may be made in the invention without departing from its true spirit and scope. It is, therefore, aimed in the appended claims to cover all such equivalent variations as fall within the true spirit and scope of the invention.

It is claimed:

1. A resilient compressible offset printing blanket of the type comprising (a) a base layer comprising a member chosen from the group consisting of a machine direction, elongation stabilizing material and an adhesive material;
    (b) a compressible layer over said base layer and comprising foamed rubber having a substantially closed celled structure; and
    (c) an ink transfer face layer over said compressible layer, the improvement comprising said resilient compressible offset printing blanket being free of any intervening woven stabilizing layer between the foamed rubber compressible layer and the face layer while having means giving the substance of the stability that would be provided by such a woven stabilizing layer between the foamed rubber compressible layer and the face layer.

2. The resilient compressible offset printing blanket of claim 1 wherein said ink transfer face layer has an inking face not more than about 20 mils from said foamed rubber compressible layer.

3. The resilient compressible offset printing blanket of claim 1 wherein the structure over said foamed rubber compressible layer consist essentially of a hard rubber layer and said ink transfer face layer.

4. The resilient compressible offset printing blanket of claim 1 wherein at least 50% of the foamed cells are closed cells having average cell diameters of between about ½ and about 10 mils and said foam is a virgin blown foam formed by gas expansion and is substantially free of solid material internal of the closed cell walls of the rubber matrix of said compressible layer other than blowing agent residue.

5. The resilient compressible offset printing blanket of claim 4 wherein said compressible layer has a void volume of at least about 20%, a thickness of not more than about 30 mils and is not more than about 20 mils from the outer surface of said element opposite said base layer.

6. The resilient compressible offset printing blanket of claim 5 wherein the structure over said foamed rubber compressible layer consist essentially of a hard rubber having a durometer greater than 75 and said ink transfer face layer and wherein said compressible layer has a void volume of at least 30% and a thickness of not more than about 20 mils and at least about 80% of the foamed cells are closed cells and the average cell diameter is between about 2 and about 7 mils.

* * * * *

REEXAMINATION CERTIFICATE (1330th)
United States Patent [19]

Rodriguez

[11] B1 4,303,721

[45] Certificate Issued  Jul. 24, 1990

[54] CLOSED CELL FOAM PRINTING BLANKET

[75] Inventor: Jorge M. Rodriguez, Miami, Fla.

[73] Assignee: W. R. Grace & Co.

Reexamination Request:
No. 90/001,764, Apr. 27, 1989

Reexamination Certificate for:
Patent No.: 4,303,721
Issued: Dec. 1, 1981
Appl. No.: 59,343
Filed: Jul. 20, 1979

[51] Int. Cl.$^5$ ............................ B32B 7/02; B32B 5/18
[52] U.S. Cl. .................................... 428/213; 428/215; 428/304.4; 428/319.3; 428/908; 428/909
[58] Field of Search ...................... 428/213, 215, 304.4, 428/319.3, 909, 908

[56] References Cited

FOREIGN PATENT DOCUMENTS

| | | | |
|---|---|---|---|
| 1250912 | 10/1971 | United Kingdom | 428/908 |
| 1327757 | 8/1973 | United Kingdom | 428/909 |
| 1327758 | 8/1973 | United Kingdom | 428/909 |
| 1400932 | 7/1975 | United Kingdom | 428/909 |

*Primary Examiner*—William J. Van Balen

[57] ABSTRACT

A resilient compressible printing element having a rubber layer with foamed closed cells therein. The closed cells are formed by the use of blowing agents which are activated and foam the material while an external pressure is applied to the material to restrict expansion.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 3 and 6 are determined to be patentable as amended.

Claims 2, 4 and 5, dependent on an amended claim, are determined to be patentable.

New claims 7-9 are added and determined to be patentable.

1. A resilient compressible offset printing blanket of the type comprising
(a) a base layer comprising a member chosen from the group consisting of a machine direction, elongation stabilizing material and an adhesive material;
(b) a compressible layer over said base layer and comprising foamed rubber having a substantially closed celled structure; and
(c) an ink transfer face layer over said compressible layer,
the improvement comprising said resilient compressible offset printing blanket being free of any intervening woven stabilizing layer between the foamed rubber compressible layer and the face layer while having means giving the substance of the stability that would be provided by such a woven stabilizing layer between the foamed rubber compressible layer and the face layer, *said means being a hard rubber layer formed of a rubber and an inorganic filler, or carbon black and a thermosetting polymer.*

3. The resilient compressible offset printing blanket of claim 1 wherein the structure over said foamed rubber compressible layer consist essentially of [a] *said* hard rubber layer and said ink transfer face layer.

6. The resilient compressible offset printing blanket of claim 5 wherein the structure over said foamed rubber compressible layer consist essentially of a hard rubber having a durometer greater than 75, *said hard rubber being comprised of a rubber selected from the group consisting of nitrile rubber, natural neoprene, butadiene-styrene, ethylene-propylene, polybutadiene, polyacrylic, polyurethane, epichlorohydrin, and chlorosulfonated polyethylene; an inorganic filler or carbon black and a rigid thermosetting polymer,* and said ink transfer face layer and wherein said compressible layer has a void volume of at least 30% and a thickness of not more than about 20 mils and at least about 80% of the foamed cells are closed cells and the average cell diameter is between about 2 and about 7 mils.

*7. A resilient compressible offset printing blanket comprising a base layer of machine direction, elongation stabilizing material and an adhesive material; a compressible layer over said base layer and comprising foamed rubber having a substantially closed celled structure; a hard rubber layer over said compressible layer, said hard rubber layer being comprised of a rubber and inorganic fillers, or carbon black and a rigid thermosetting resin; and an ink transfer face layer over said hard rubber layer.*

*8. The resilient compressible offset blanket of claim 7 wherein the hard rubber layer is comprised of a nitrile rubber, carbon black and a phenolic resin.*

*9. A resilient compressible offset printing blanket comprising a base layer of machine direction, elongation stabilizing material and an adhesive material; a compressible layer over said base layer and comprising foamed rubber having a substantially closed celled structure, said compressible layer having a void volume of at least 30% and a thickness of not more than 20 mils, at least about 80% of the foamed cells are closed cells and the average cell diameter is between about 2 and about 7 mils, a hard rubber layer over said compressible layer, said hard rubber layer having a durometer greater than 75 and being comprised of a rubber selected from the group consisting of nitrile rubber, neoprene, butadiene styrene, ethylene-propylene, polybutadiene, polyacrylic, polyurethane, epichlorohydrin or chlorosulfonated polyethylene; an inorganic filler or carbon black and a thermosetting polymer; and an ink transfer face layer over said hard rubber layer.*

* * * * *